UNITED STATES PATENT OFFICE.

JOSEPH KOTRBA, OF ST. LOUIS, MISSOURI.

PAINT-SOLVENT.

SPECIFICATION forming part of Letters Patent No. 328,589, dated October 20, 1885.

Application filed August 13, 1885. Serial No. 174,317. (No specimens.)

*To all whom it may concern:*

Be it known that I, JOSEPH KOTRBA, a resident of the city of St. Louis, county of St. Louis, and State of Missouri, have invented and discovered a new and useful composition of matter to be called "The Eureka Paint Dissolver," the same to be used for the purpose of dissolving all paints, oils, and varnishes; and I do hereby declare that the following is a true, full, and clear description of the invention, which will enable others skilled in the arts to which it appertains to make, compound, and use the same.

My invention relates to a composition of matter to be applied with an ordinary painter's brush, to paints, oils, and varnishes upon surfaces of all kinds of wood, iron, or other works or materials for the purpose of dissolving and removing the same fully and completely, so that said wood, iron, or other works or materials may be again repainted, oiled, or varnished as readily as if they had not been previously painted, oiled, or varnished, without the slightest injury to the said wood, iron, or other works, or materials that may be operated upon.

My composition consists of the following ingredients, combined in the proportions stated, viz: pure rain-water, one hundred pounds; carbonate of soda, two hundred pounds; good pure vinegar, three hundred pounds; slaked lime, six hundred pounds.

In preparing the composition I slake lime with as little pure rain-water as will thoroughly slake it, taking care not to have it too soft, as too much water will weaken it. Then I dissolve the above quantity of carbonate of soda in pure boiling rain-water. I use pure rain-water on account of its softness, for if hard water be used it does not work so well—a fact I have found by experiments. When dissolved I set it from the fire and pour the above quantity of good vinegar in the solution. I use the vinegar for the purpose of curing wood-works of all kinds, for when carbonate of soda is used without good vinegar wood-work of all kinds (soft-wood work especially) will not retain paint, after being repainted, as they should, as carbonate of soda, when used for alkali in any preparation, will create, when applied to wood surfaces, greasy matter and partially closes the pores of wood-work, so that when it is repainted the paint does not adhere as firmly as it should; but by using good pure vinegar in the quantity above stated this is overcome, as the greasy matter is thoroughly cleansed by the vinegar, or is, as painters term it, "cured." Then I add the slaked lime in about the proportions stated and mix well.

When well mixed the composition resembles a ready-mixed paint, the slaked lime serving double purpose, first, when mixed with carbonate of soda in the quantity specified it makes excellent dissolver; second, it gives the composition a body, so that it can be applied at any angle like a paint, and will not run over other places where it is not desired. Then I put the composition in cans, which are, after filling, hermetically sealed, let stand fourteen days, and it is ready for use.

Before using the above composition it should be well mixed for a few minutes; then applied with a brush, knife, or any other suitable instrument, care being taken to spread it evenly and as thick as the nature of the paint requires—as, for instance, for ordinary paint it will be sufficient if it is covered so that the old paint cannot be seen through it, as it depends on how thick and old the old paint is. Where the paint is too thick a thicker coat of the composition will be required.

In from ten to forty-five minutes the composition will dissolve paint in almost all cases. Exceptionally hard paint may require repetition, (but it will be only in very hard cases.) Then the paint may be washed off with brush and water, or scraped; but I recommend moderately-hard scrub-brush and water, as in scroll or ornamental work of any kind the brush will be found the most efficient, because the hair or fiber of a brush will clean that class of work better than any other instrument.

I am aware that a composition consisting of carbonate of soda and carbonate of lime has been used for the same purpose, and that a patent therefor was granted to Herman Gasser, of Platteville, Wisconsin, No. 242,298, of the cylinder A, at the ends thereof, as seen in Fig. 1, and small nails are employed, as at 2 and 3, to connect the parts together.

I claim as my invention—

1. The cylinder A, of straw or mill board, in combination with the sheet-metal strip C, attached to one edge of the said straw-board, and having its edge folded over the metal strips D D', that are U-shaped and united together and securely attached to the other edge of the said cylinder, one edge of the strip D being folded back and the folded sheet-metal junction-strip T, substantially as set forth.

2. The combination, in a drum, of a cylinder of straw-board or similar material, two U-shaped strips of sheet metal, D D', set back to back and soldered, the strip D' being adapted to receive and be united to one edge of the straw-board, the sheet-metal strip C, and a fastening device for attaching together the strips C and D upon the edges of such straw-board, heads for the package, and hoops around the cylinder at its junction with the heads, substantially as specified.

Signed by me this 15th day of May, A. D. 1885.

JAS. H. PREATER.

Witnesses:
GEO. T. PINCKNEY,
WILLIAM G. MOTT.